Feb. 27, 1962    E. T. THOMPSON    3,022,846
MINIATURE MOTOR VEHICLE
Filed Feb. 13, 1961    2 Sheets-Sheet 1

INVENTOR.
ELVIN T. THOMPSON
BY
*W. B. Harpman*
ATTORNEY

Feb. 27, 1962

E. T. THOMPSON 3,022,846

MINIATURE MOTOR VEHICLE

Filed Feb. 13, 1961

INVENTOR.
ELVIN T. THOMPSON

BY

*W. B. Harpman*

ATTORNEY

United States Patent Office 3,022,846
Patented Feb. 27, 1962

3,022,846
MINIATURE MOTOR VEHICLE
Elvin T. Thompson, Alliance, Ohio, assignor to Lewis Engines, Inc., Alliance, Ohio, a corporation of Ohio
Filed Feb. 13, 1961, Ser. No. 88,709
4 Claims. (Cl. 180—11)

This invention relates to a miniature motor vehicle and more particularly to a vehicle known as a track cart.

The principal object of the invention is the provision of a miniature motor vehicle in which the frame and body portions are integral and in which a rear frame and body portion is separable from a front frame and body portion.

A further object of the invention is the provision of a miniature motor vehicle that may be adapted to various engine sizes by replacement of a rear frame and body portion.

A still further object of the invention is the provision of a miniature motor vehicle in which a front frame and body portion that is relatively low and flat with a very low center of gravity is detachably joined to a rear frame and body portion of a different height and center of gravity.

A still further object of the invention is the provision of a miniature motor vehicle in which the over-all length of the same as well as the wheel base thereof may be varied by replacing a rear frame and body portion.

A still further object of the invention is the provision of a miniature motor vehicle which is comprised of a front frame and body detachably connected to a rear frame and body portion and wherein essential parts of the vehicle are mounted in each of said frame and body portions and detachably connected to one another.

The miniature motor vehicle disclosed herein comprises an improvement in the vehicles known as track carts which are designed for racing and carry only the driver. The miniature motor vehicles heretofore known in the art have had integral frame and body portions of a size determined by the particular engine sizes used together with the particular size of wheels used; the present invention relates to an improved miniature motor vehicle wherein a two-part frame and body permits substitution of one part for another of different size and carrying a different sized engine and wheels.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein.

Figure 1:
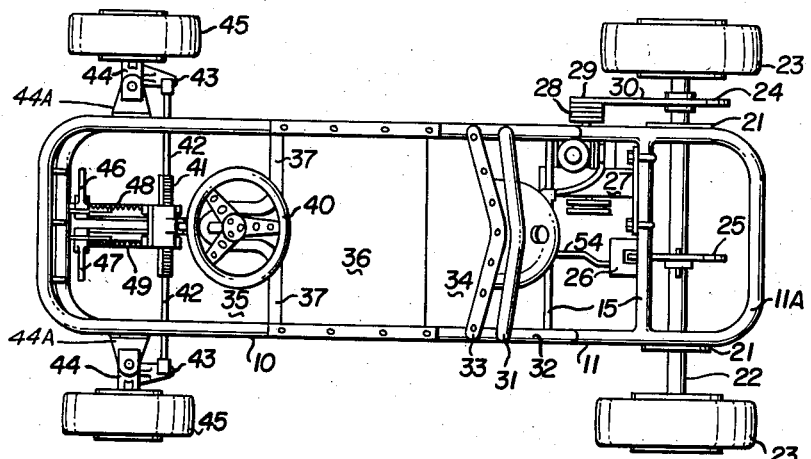
FIGURE 1 is a top plan view of the miniature motor vehicle.
Figure 2:
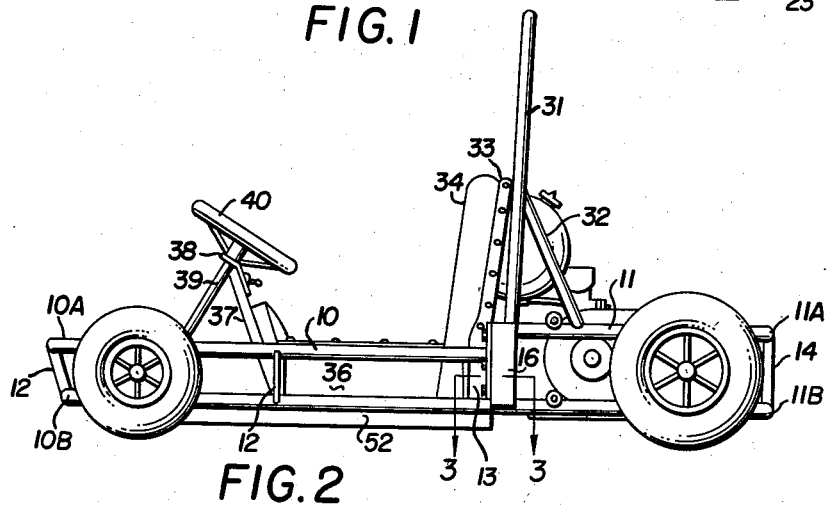
FIGURE 2 is a side elevation thereof.
Figure 3:
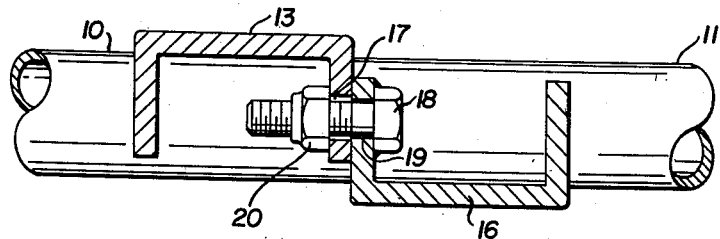
FIGURE 3 is an enlarged horizontal section on line 3—3 of FIGURE 2.

By referring to the drawings and FIGURES 1 and 2 in particular, it will be seen that the miniature motor vehicle comprises a front frame and body portion 10 and a rear frame and body portion 11. The front frame and body portion comprises a pair of superimposed U-shaped frame members 10A and 10B positioned in vertically spaced relation by a plurality of substantially vertically extending spaced members 12, 12. The front of the frame and body portion 10 is preferably angularly disposed as may best be seen in FIGURE 2 of the drawings and the rear of the front frame and body portion 10 is defined by sections of vertically positioned members which may be channels 13, 13 as best seen in FIGURES 2 and 3 of the drawings and to which channels 13, 13 the ends of the arms of the U-shaped members 10A and 10B are secured as by welding. The rear frame and body portion 11 is formed of a pair of superimposed vertically spaced frame members 11A and 11B with vertical spacing members 14 positioned therebetween and a pair of transversely positioned frame members 15, 15 extending thereacross. The front ends of the frame members 11A and 11B are joined by welding the same to a pair of vertically positioned secondary channels 16, 16 which channels 16, 16 are arranged to abut the channels 13, 13 heretofore referred to. Apertures 17 are formed in the channels 13 and bolts 18 are positioned through apertures 19 in the channels 16 to engage the apertures 17 and extend therethrough to receive nuts 20. The front frame and body portion 10 is thereby detachably secured to the rear frame and body portion 11 and it will be obvious that the respective sizes and shapes of the two frame and body portions 10 and 11 need not be uniform with the exception of the meeting portions of the members 13 and 16. This construction permits a different rear frame and body portion to be substituted and thereby meets one of the objects of the invention.

The rear frame and body unit 11 has depending axle brackets 21 attached thereto and an axle 22 is rotatably positioned therein with road engaging wheels 23, 23 thereon. A sprocket 24 is secured to the axle 22 and a disc 25 is secured to the axle 22. A disc brake mechanism 26 is attached to one of the transverse frame members 15 and engaged upon the disc 25 for controlling the speed of the miniature motor vehicle and an internal combustion engine 27 is secured to the transverse frame members 15 for driving the miniature motor vehicle. The internal combustion engine 27 drives a centrifugal clutch 28 which in turn has a sprocket 29 thereon and a chain 30 interconnects the sprockets 29 and 24 so that driving motion of the engine 27 will be conveyed to the rear axle 22.

A roll bar 31 has its opposite ends secured to the frame member 11A on the opposite sides thereof and extends upwardly thereabove to form a device protecting a driver of the miniature motor vehicle. Rearwardly angled brace rods 32 interconnect the roll bar 31 and the frame member 11A. Immediately adjacent the channels 13, 13 on the front body portion 10 of the miniature motor vehicle, there is a back rest frame 33 which supports a cushion 34. The front frame and body portion has a floor 35 therein, the rearmost portion of which supports a seat cushion 36. A pair of curving arms 37, 37 are positioned across the frame and body member 10 in front of the seat cushion 36 and extend upwardly and forwardly to support an apertured bracket 38 on their uppermost ends. A shaft 39 is positioned through the apertured bracket 38 and has a steering wheel 40 secured to its uppermost end. The lowermost end of the shaft 39 is provided with a gear (not shown) which engages a rack 41 which in turn is connected by means of rods 42, 42 with steering brackets 43, 43 on pivoted front wheel supporting axles 44, 44 which are in turn pivotally mounted on axle brackets 44A, 44A on either side of the front frame and body portion 10. Ground engaging wheels 45, 45 are mounted on the axles 44.

Figure 6:
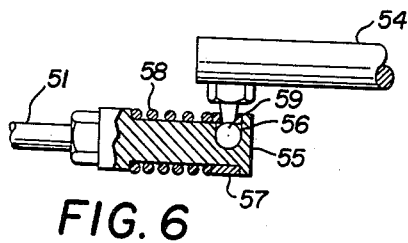
FIGURE 6 is an enlarged detail of a control rod connector.
Figure 7:
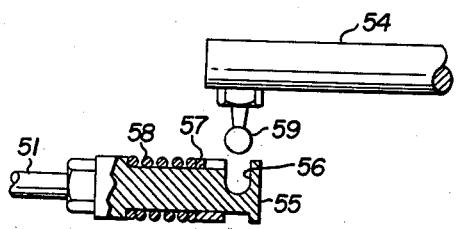
FIGURE 7 is an enlarged detail of the control rod connector shown in FIGURE 6 and showing the parts thereof in detached relation.

A pair of pedals 46 and 47 are pivoted to brackets mounted on the floor 35 of the front body portion 10 of the miniature motor vehicle and are normally urged rearwardly by springs 48 and 49. The pedals 46 and 47 are connected by rods 50 and 51 which extend rearwardly under the floor 35 and are enclosed in a tunnel 52. The rearmost part of the tunnel 52 is adjacent the foremost part of the rear body portion 11. Separate control rod extension sections 53 and 54 are connected to the rods 50 and 51 at a point beneath the back rest frame 31 and extend to the carburetor control of the internal combustion engine 27 and to the disc brake mechanism 26 heretofore described. These control rods 50 and 51 and extensions thereof are provided at their points of connection with one another with readily separable connection means as illustrated in FIGURES 6 and 7 of the drawings. By referring thereto, it will be seen that the control rod 5 for example, is provided at its rearmost end with a flanged fitting 55 having a socket 56 therein and an apertured collar 57 slidably disposed thereabout. A coil spring 58 normally urges the collar 57 against the flanged end of the fitting 55 where it retains a ball fitting 59 in the socket 56. The ball fitting 59 is attached to and depends from the foremost end of the control rod extension 54. In FIGURE 7 of the drawings the respective parts of the connection means will be seen in separated relation and in FIGURE 6 in engaged relation. By referring again to FIGURES 1, 2 and 4 of the drawings, it will be seen that the back rest frame supports a fuel tank 60 which is half spherical shape and which is positioned in the area beneath the roll bar 31. A fuel line 61 extends from the fuel tank 60 to the carburetor on the internal combustion engine 27.

Figure 4:
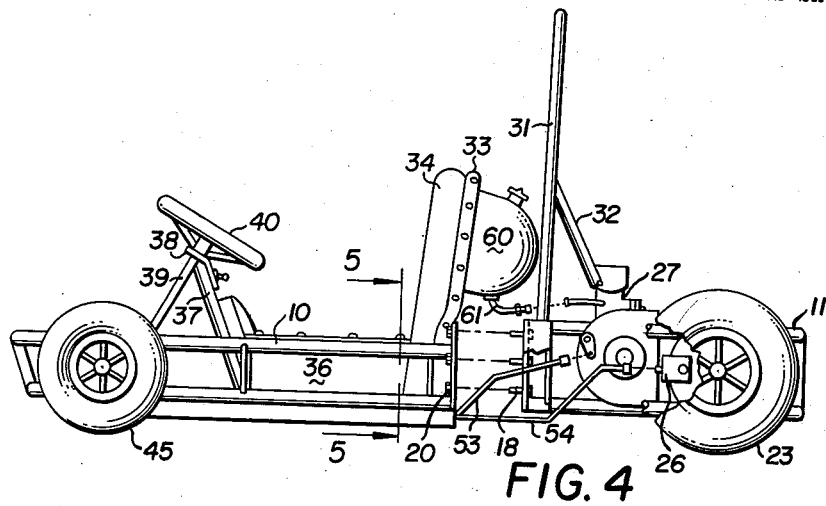
FIGURE 4 is a side view of the miniature vehicle viewed with parts broken away and parts in spaced relation.
Figure 5:
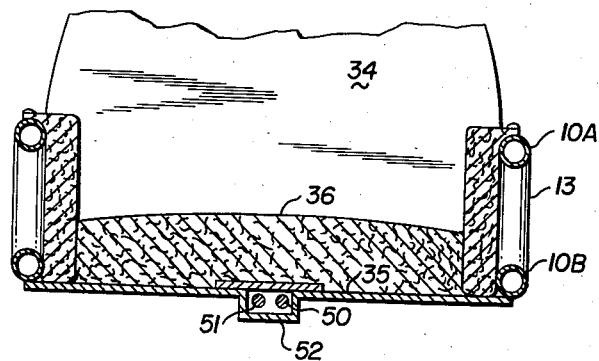
FIGURE 5 is an enlarged vertical section on line 5—5 of FIGURE 4.

By referring now to FIGURE 4 in particular, it will be seen that the bolts 18 have been disengaged from the nuts 20 and the rear frame and body member 11 carrying the internal combustion engine 27 and the roll bar 31 has been moved backwardly with respect to the front body and frame portion 10 as would occur if a substitute rear portion were to be used. For example, one with a smaller or larger engine and smaller or larger wheels. The formation of the miniature motor vehicle with a separable front frame and body portion 10 and a separate rear frame and body portion 11 makes possible the ready adaptability of the miniature motor vehicle as desired by the user, and it conserves shipping space. It will thus be seen that the miniature motor vehicle disclosed herein comprises a structure which is formed of two separate and distinct frame and body portions and that these separate frame and body portions may be individually styled and equipped and then assembled to form a miniature motor vehicle having desirable characteristics and features. In addition thereto the miniature motor vehicle resulting from the assembly of separate front and rear body portions result in the positioning of the driver at a lower center of gravity than would otherwise be possible and with the desirable characteristic of incorporating larger driving wheels and a larger engine than would be possible if a unitary frame and body structure were used as has heretofore been common.

It will thus be seen that the miniature motor vehicle disclosed herein meets the several objects of the invention and having thus described my invention, what I claim is:

1. A miniature motor vehicle comprising a front frame section and a rear frame section, said front frame section comprising a pair of superimposed substantially U-shaped body members spaced vertically with respect to one another, a floor secured to the lower one of said U-shaped body members, a driver's seat positioned on said floor, steering gear positioned on said floor and extending thereabove, axle brackets secured to said oppositely disposed points on the sides of said front frame section adjacent its forward end, axles pivoted to said axle brackets and ground engaging wheels positioned on said axles, said steering gear engaged on said axles, said rear frame portion comprising a pair of superimposed substantially U-shaped body members having spacing means, and transverse frame members interconnecting the same, journals secured to said rear frame section and an axle rotatably mounted in said journals transversely of said rear frame section and adjacent the rear part thereof and ground engaging wheels on said axle, vertically disposed members secured to the back ends of said U-shaped body members of said front frame section and secondary vertically disposed members secured to the front ends of said U-shaped body members of said rear frame section, fasteners positioned through registering openings in said members normally securing said front frame section and said rear frame section to one another and control means on said front frame section, a tunnel longitudinally of said frame section, said control means being partially disposed in said tunnel and extending therefrom into the area of said rear frame section.

2. The miniature motor vehicle set forth in claim 1 and wherein the vertically disposed members secured to the back ends of the U-shaped body members of the front frame section and the secondary vertically disposed members secured to the front ends of the U-shaped body members of the rear frame section comprise channel members.

3. The miniature motor vehicle set forth in claim 1 and wherein a pair of pedals are positioned on said front frame section adjacent the forward end thereof and pivoted thereto and wherein control rods extend from said pedals beneath said floor to a point rearwardly thereof and wherein control rod extensions in said rear frame section are detachably engaged on said control rods.

4. The miniature motor vehicle set forth in claim 1 and wherein an inverted U-shaped roll bar is attached to said rear frame section adjacent the front part thereof and extends upwardly and over the same and wherein a driver's seat and back rest is positioned on said front frame section adjacent the back end thereof immediately in front of said roll bar.

References Cited in the file of this patent

UNITED STATES PATENTS

| | | |
|---|---|---|
| 2,128,930 | Fageol et al. | Sept. 6, 1938 |
| 2,919,139 | Rupp | Dec. 29, 1959 |

FOREIGN PATENTS

| | | |
|---|---|---|
| 630,318 | Great Britain | Oct. 11, 1949 |